(12) United States Patent
Cadigan et al.

(10) Patent No.: US 10,324,879 B2
(45) Date of Patent: Jun. 18, 2019

(54) MITIGATION OF SIDE EFFECTS OF SIMULTANEOUS SWITCHING OF INPUT/OUTPUT (I/O DATA SIGNALS

(71) Applicant: International Business Machines Corporation, Armonk, NY (US)

(72) Inventors: David D. Cadigan, Poughkeepsie, NY (US); Samuel R. Connor, Apex, NC (US); Michael A. Cracraft, Poughkeepsie, NY (US); William V. Huott, Holmes, NY (US); Adam J. McPadden, Underhill, VT (US); Anuwat Saetow, Austin, TX (US); Gary A. Tressler, Sandy Hook, CT (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 15/278,665

(22) Filed: Sep. 28, 2016

(65) Prior Publication Data

US 2018/0089126 A1   Mar. 29, 2018

(51) Int. Cl.
*G06F 13/40*  (2006.01)
*G06F 13/42*  (2006.01)
*G06F 1/3296*  (2019.01)

(52) U.S. Cl.
CPC ........ *G06F 13/4022* (2013.01); *G06F 1/3296* (2013.01); *G06F 13/4286* (2013.01)

(58) Field of Classification Search
None
See application file for complete search history.

(56) References Cited

U.S. PATENT DOCUMENTS

| 4,839,573 A | 6/1989 | Wise |
| 5,554,945 A | 9/1996 | Lee et al. |
| 5,956,288 A | 9/1999 | Bermingham et al. |
| 6,294,925 B1 | 9/2001 | Chan et al. |

(Continued)

FOREIGN PATENT DOCUMENTS

JP   61082454 A   4/1986

OTHER PUBLICATIONS

Disclosed Anonymously, "A Method for Noise Aware Placement Refinement", IP.Com, IP.Com No. 000228169, Jun. 10, 2013, 14 pp.

*Primary Examiner* — Michael Sun
(74) *Attorney, Agent, or Firm* — Patterson + Sheridan, LLP (57) ABSTRACT

An apparatus and method may detect and reduce noise on data busses by adjusting the phase of the input/output (I/O) signals in a controlled, predictable manner. The control may allow a maximum data rate to be achieved. In one embodiment, an algorithm used to determine phase change data may be handled by a feedback loop and may be dynamically adjusted. The system may detect noise on rails and critical signals for logging in call home data. The system may maintain a database of settings as a function of a workload. The system may be used in the field as the workload changes to determine that a signal has reached a first threshold. In response to determining that the signal has reached the first threshold, an alert is initiated. A system may determine that the signal has reached a second threshold. In response to determining that the signal has reached the second threshold, the signal may be coupled to logic circuitry.

19 Claims, 7 Drawing Sheets

(56) References Cited

U.S. PATENT DOCUMENTS

| | | |
|---|---|---|
| 6,459,313 B1 | 10/2002 | Godbee et al. |
| 6,559,701 B1 | 5/2003 | Dillon |
| 6,748,549 B1 | 6/2004 | Chao |
| 7,446,561 B2 | 11/2008 | May et al. |
| 7,486,702 B1 | 2/2009 | Yang |
| 7,859,309 B2 | 12/2010 | Lo |
| 7,912,169 B2 * | 3/2011 | Saeki ............... H03M 9/00 375/354 |
| 8,040,155 B2 | 10/2011 | Tran Vo et al. |
| 8,149,874 B2 | 4/2012 | Ching et al. |
| 8,274,322 B2 | 9/2012 | Chang et al. |
| 8,542,787 B2 * | 9/2013 | Hampel ............... G11C 7/10 375/362 |
| 8,595,542 B2 | 11/2013 | Dimitriu et al. |
| 8,929,496 B2 * | 1/2015 | Lee ............... H04L 7/0062 375/355 |
| 2004/0143774 A1 | 7/2004 | Jacobs |
| 2007/0036084 A1 * | 2/2007 | Lindsay ............ H04B 10/66 370/246 |
| 2008/0013609 A1 * | 1/2008 | Daxer ............... H04B 3/46 375/221 |
| 2008/0189575 A1 * | 8/2008 | Miguelanez ....... G05B 23/0229 714/25 |
| 2010/0171659 A1 * | 7/2010 | Waters ............... G01S 19/34 342/357.74 |
| 2013/0177106 A1 * | 7/2013 | Levesque ........... H03F 1/0227 375/297 |
| 2013/0286765 A1 | 10/2013 | Swanson et al. |
| 2014/0286381 A1 * | 9/2014 | Shibasaki ........... H03L 7/089 375/226 |

* cited by examiner

MITIGATION OF SIDE EFFECTS OF SIMULTANEOUS SWITCHING OF INPUT/OUTPUT (I/O DATA SIGNALS

I. FIELD OF THE DISCLOSURE

The present disclosure relates generally to signal noise, and in particular, to mitigating signal noise caused by simultaneous switching of input/output (I/O) data signals.

II. BACKGROUND

As computers increase their frequencies, significant challenges/problems with voltage rail noise, line to line signal couplings, and simultaneous switching side effects arise. An effective method to detect, log, and minimize these problems without reducing frequency or data bandwidth is needed.

III. SUMMARY OF THE DISCLOSURE

Apparatus and methods are disclosed to detect and reduce noise on data busses by adjusting the phase(s) of input/output (I/O) data signals in a controlled, predictable manner to achieve a maximum data rate. In a particular embodiment, an apparatus includes a glitch receiver configured to determine that a signal has reached a first threshold. The glitch receiver may be further configured to alert a logic circuitry in response to determining that the signal has reached the first threshold. The glitch receiver may be further configured to determine that the signal has reached a second threshold. The glitch receiver may also be configured to couple the signal to the logic circuitry in response to determining that the signal has reached the second threshold. The apparatus may also include a standard receiver configured to receive the signal, where the glitch receiver and the standard receiver are coupled in parallel to the logic circuitry.

In another embodiment, a method includes determining that a signal has reached a first threshold. The method may also include alerting a logic circuitry in response to determining that the signal has reached the first threshold. The method may also include determining that the signal has reached a second threshold. The method may further include coupling the signal to the logic circuitry in response to determining that the signal has reached the second threshold.

In another embodiment, a computer program product for phase adjustments of signal, the computer program product includes a computer readable storage medium having program instructions executable by a device to cause the device to determine whether a signal has exceeded a threshold. The program instructions may further cause the device to capture input/output (I/O) data signals associated with the signal. The capture may be initiated in response to determining that the signal has exceeded the threshold. The program instructions may further cause the device to adjust at least one of a phase of the I/O data signals with respect to other I/O data signals. The program instructions may further cause the device to adjust corresponding receivers of the I/O data signals based on adjustment of the at least one of the phase of the I/O data signals.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

V. DETAILED DESCRIPTION

A system may detect and reduce noise on data busses by adjusting the phase of the input/output (I/O) signals in a controlled, predictable manner. The control may allow a maximum data rate to be achieved. In one embodiment, an algorithm used to determine phase change data may be handled by a feedback loop and may be dynamically adjusted. The system may detect noise on rails and critical signals for logging in call home data. The system may maintain a database of settings as a function of a workload. The system may be used in the field as the workload changes.

Line to line signal couplings or harmonics may occur when I/O data signals in an integrated circuit (I/C), device, or circuit card switch simultaneously or transition in the same direction at the same time. A signal may become noisy due to the effects of the line to line signal couplings or the harmonics. The effects of the line to line signal couplings or the harmonics may be amplified over time causing systematic fails. Failures may be associated with a particular workload or combinations of workloads. A workload is a particular cluster of program software working at the same time. The workload may change from one operation to another operation.

To mitigate side effects of the simultaneous switching of the I/O data signals, a signal may be monitored to determine whether the signal has reached a threshold. Alternatively, a plurality of signals may be monitored. The signal may include a critical signal. A noisy signal may be detected or determined based on the threshold. The threshold may correspond to a particular magnitude of the signal, a range of magnitudes of the signal, a particular phase of the signal, a range of phases of the signal, or any combination thereof. The threshold may include a plurality of thresholds. The detection or the determination of the noisy signal may be recoded to a storage device configured to record or log the detection or the determination of the noisy signal and associated I/O data signals. Phases of the I/O data signals may be adjusted to lower impacts of simultaneous switching harmonics. The impacts of the simultaneous switching harmonics may be monitored overtime.

A rolling data buffer may be used to capture I/O patterns at a particular time of the detection or the determination of the noisy signal. The I/O pattern may be recorded or logged. The I/O pattern may be used during phase calibration to verify improved settings or adjustments of the phases of the I/O data signals.

A database of the I/O phase settings from known workloads may be created. As the workloads change during operation in the field, at least one of the phases of the I/O data signals may be adjusted based on a best fit determination using the database to minimize noise or simultaneous switching events. The database may be updated over time as new workloads are encountered by a system. The database update may be based on a call home operation that feeds characteristics of the new workloads to the database.

Details and decision of a phase change of an I/O data signal may be handled by a feedback loop. The phase change may be dynamically adjusted. The database may be maintained to include settings associated with specific workload or combination of workloads.

Figure 1:
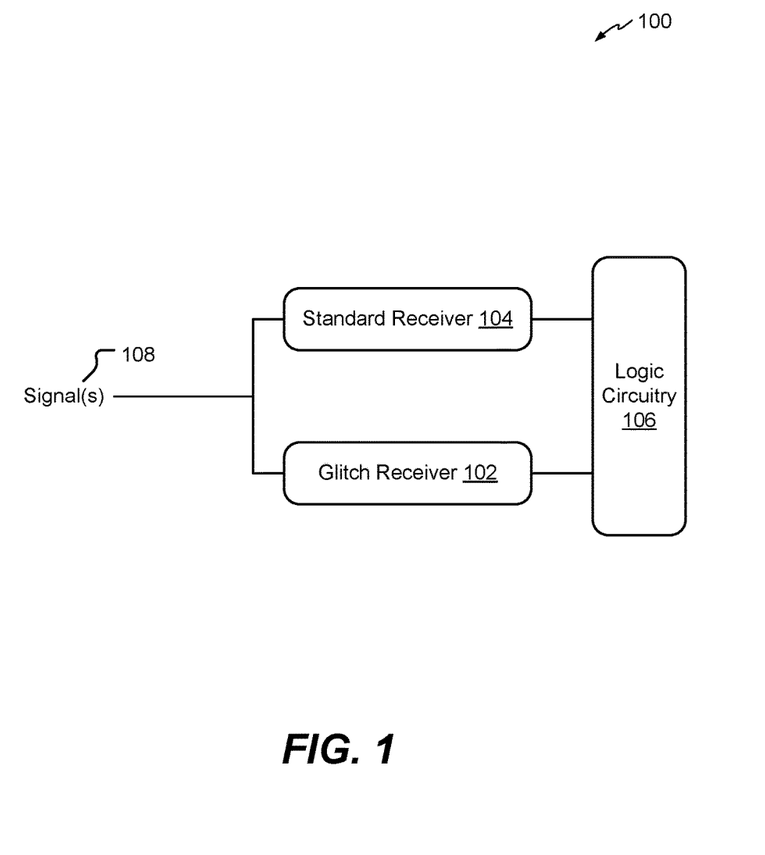
FIG. 1 is a diagram illustrating an exemplary embodiment of the mitigating side effects of the simultaneous switching of input/output (I/O) data signal.

Turning more particularly to the Drawings, FIG. 1 shows an exemplary embodiment of the mitigating side effects of the simultaneous switching of an I/O data signal. One or more signals 108 may be associated with signals from an I/C chip, a signal pad, or a bank of signals. The signals 108 may correspond to data signals, voltage signals, or current signals. A standard receiver 104 may be configured to receive the signals 108. A glitch receiver 102 and the standard receiver 104 may be coupled in parallel to logic circuitry 106. The standard receiver 104 may also couple the signals 108 to the logic circuitry 106.

The glitch receiver 102 may be configured to determine that the signals 108 have reached a first threshold. The glitch receiver 102 may also be configured to alert the logic circuitry 106 in response to determining that the signals 108 have reached the first threshold. The glitch receiver 102 may also be configured to determine that the signals 108 have reached a second threshold. The glitch receiver 102 may be further configured to couple the signals 108 to the logic circuitry 106 in response to determining that the signals 108 have reached the second threshold. Alternatively, the glitch receiver 102 and the standard receiver 104 may be configured to receive a plurality of signals.

In another embodiment, the glitch receiver 102 may be configured to determine that the signals 108 have not reached the second threshold for a particular period of time. In response to the signals 108 not reaching the second threshold, a flag may be asserted to indicate that a phase calibration is required.

While a glitch receiver 102 is shown in FIG. 1, phase adjustments may alternatively be initiated based on sensing supply voltages, themselves. The embodiment of such a system (beyond the sensing portion) operates in a manner similar or identical to that described herein. For instance, a sensing module of such an embodiment may include an on-chip macro that senses skitter (e.g., skew plus jitter) to sense of a supply voltage. Other methods of sensing supply voltages are known in the art (e.g., P. J. Restle et al., "Timing uncertainty measurements on the Power5 microprocessor," Solid-State Circuits Conference, 2004. *Digest of Technical Papers*. ISSCC. 2004 IEEE International, 2004, pp. 354-355 Vol. 1).

Figure 2:
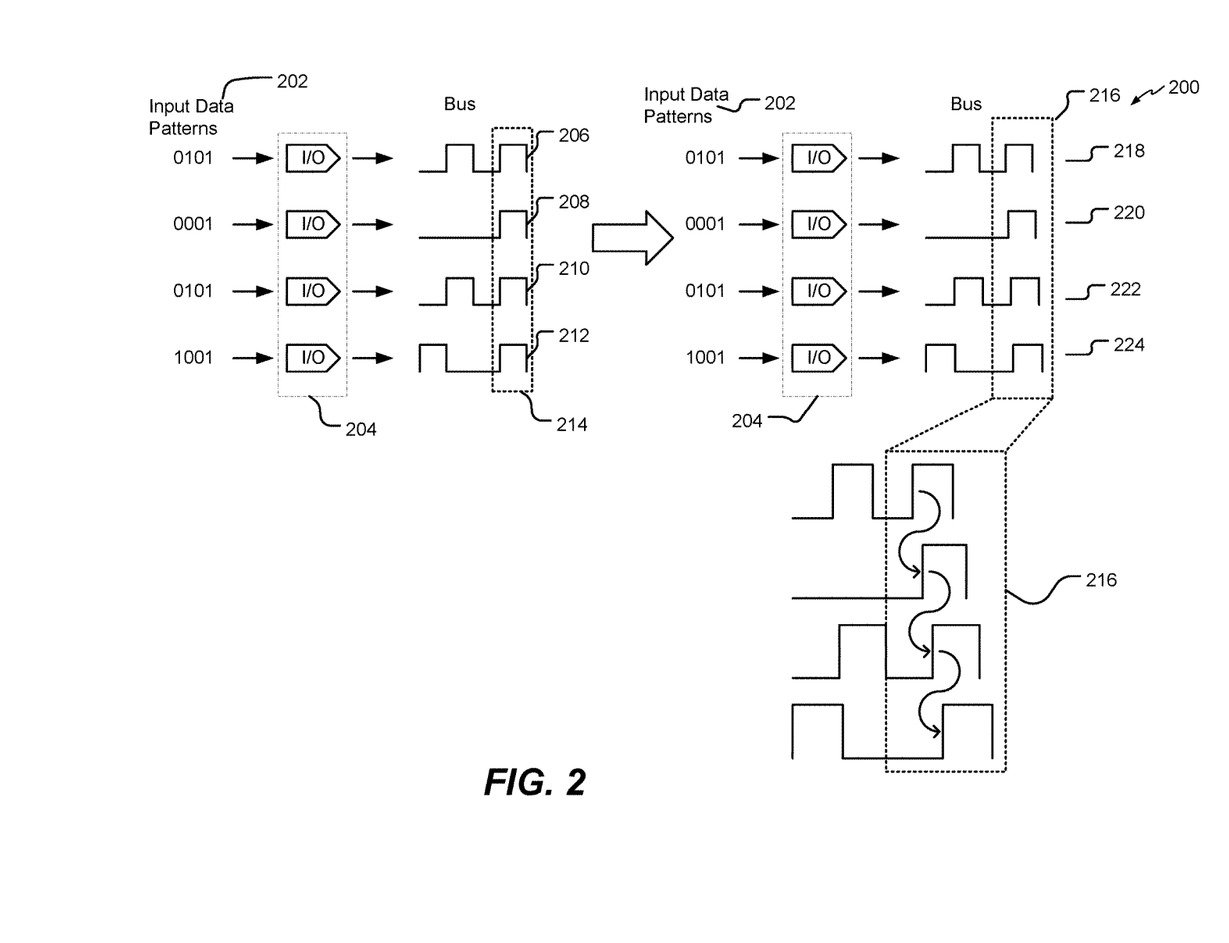
FIG. 2 is a diagram illustrating the simultaneous switching of I/O data signal and an exemplary embodiment that mitigates the side effects of the simultaneous switching of the I/O data signal.

FIG. 2 is an exemplary illustration of the simultaneous switching of I/O data signals and of the mitigating the side effects. Input data patterns 202 are clocked to I/O interfaces 204. The resulting output of the I/O interfaces 204 may be I/O data signals 206, 208, 210, 212. The I/O data signals 206, 208, 210, 212 depict data signals that transitioned in the same direction at the same time, or data signals that switched simultaneously. One way to mitigate the simultaneous switching of the I/O data signals 206, 208, 210, 212 is to adjust the phases of each of the I/O data signals 206, 208, 210, 212 with respect to one another. The phases 216 of I/O data signal 218, 220, 222, 224 are offset with respect to one another. For example, a phase of data signal 220 is offset with respect to a phase of data signal 218. A phase of data signal 222 may be offset with respect to the phase of the data signal 220. A phase of data signal 224 may be offset with respect to the phase of the data signal 222.

Figure 3:
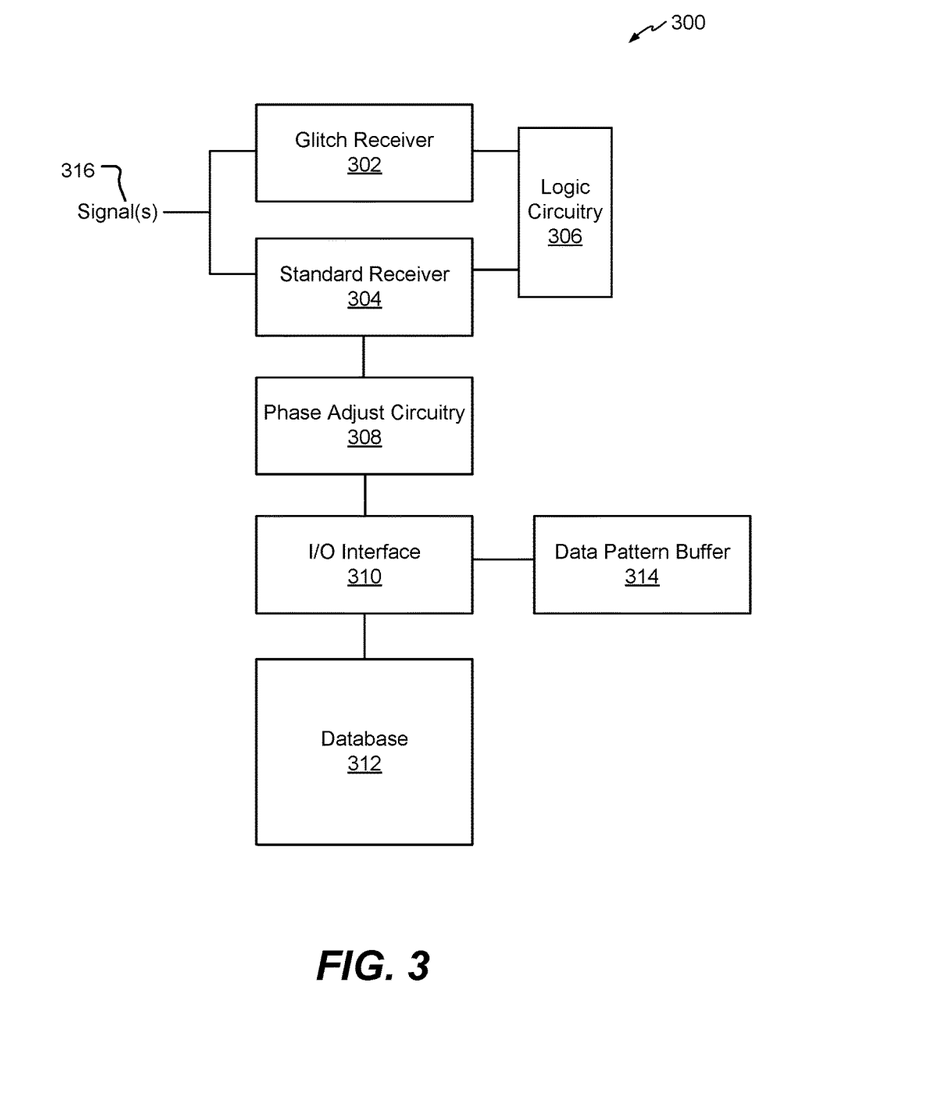
FIG. 3 is a block diagram of an exemplary embodiment of the mitigating side effects of the simultaneous switching of I/O data signal(s)

FIG. 3 depicts a diagram of an exemplary embodiment of mitigating the side effects of the simultaneous switching of one or more I/O data signals. The simultaneous switching of the I/O data signals may correspond to the simultaneous switching of the I/O data signals 214 of FIG. 2. A device 300 may include a glitch receiver 302. The glitch receiver 302 may be configured to receive signals 316. The signals 316 may correspond to the signals 108 of FIG. 1. The signals 316 may be associated with signals from another device, a plurality of devices, an I/C chip, a signal pad, or a bank of signals. The signals 316 may correspond to data signals, voltage signals, or current signals.

The glitch receiver 302 may also be configured to determine that the signals 316 have reached a first threshold. The glitch receiver 302 may also be configured to alert a logic circuitry 306 in response to determining that the signals 316 have reached the first threshold. The glitch receiver 302 may also be configured to determine that the signals 316 have reached a second threshold. The glitch receiver 302 may be further configured to couple the signals 316 to the logic circuitry 306 in response to determining that the signals 316 have reached the second threshold. The glitch receiver 302 may be further configured to determine that the signals 316 have not reached the second threshold for a particular period of time. In response to the signals 316 not reaching the second threshold, a flag may be asserted to indicate that a phase calibration is required.

In another embodiment, the device 300 may also include a standard receiver 304. The standard receiver 304 may be configured to receive the signals 316. The glitch receiver 302 and the standard receiver 304 may be coupled in parallel to the logic circuitry 306. The standard receiver 304 may also couple the signals 316 to the logic circuitry 306.

In another embodiment, the device 300 may also include phase adjust circuitry 308. The phase adjust circuitry 308 may be configured to adjust at least one of a phase of the I/O data signals associated with the signals 316 that reach a third threshold. The third threshold may correspond to the first threshold or the second threshold. Alternatively, the third threshold may be distinct from at least one of the first threshold or the second threshold. The phase of the I/O data signals may be adjusted based on a database of workload characteristics and associated I/O phase offsets. The workload characteristics may be associated with data reads per second, data writes per second, total data throughput per second, phase alignment settings, phase alignment parameters, or power noise of a system, a server, or a device. The I/O phase offsets may be associated with the at least one of the phase of the I/O data signals that are associated with the signals 316 reaching the third threshold at a particular time. A particular I/O phase offset may correspond to a particular set of workload characteristics.

In another embodiment, the phase adjust circuitry 308 may be configured to add (e.g., during a phase calibration) at least one of a test data pattern or of a data pattern captured over a period of time across I/O interfaces that are associated with the I/O data signals. The test data patterns may be determined by a user or may be preset by a manufacturer. The data patterns may be based on the database of the workload characteristics and the associated I/O phase offsets. The test data patterns or data patterns may correspond to the input data patterns 202 of FIG. 2. The I/O interfaces may correspond to the I/O interfaces 204 of FIG. 2. The I/O data signals may correspond to the I/O data signals 206, 208, 210, 212 of FIG. 2 when the I/O data signals are switched simultaneously. The I/O data signals may correspond to the I/O data signals 218, 220, 222, 224 of FIG. 2 when the I/O data signals are offset with respect to one another.

In another embodiment, the phase adjust circuitry 308 may be configured to determine whether the signals 316 are greater than the third threshold in response to adding the at least one of the test data patterns or the data patterns captured over the period of time. The phase adjust circuitry 308 may be further configured to adjust, for a second time, the at least one of the phase of the I/O data signals with respect to other I/O data signals in response to determining that the signals 316 is greater than the third threshold.

In another embodiment, the phase adjust circuitry 308 may also be configured to maintain the phase of the I/O data signals based on second adjustment of the phase of the I/O data signals. In another embodiment, the device 300 may also include a data pattern buffer 314. The data pattern buffer 314 may be configured to capture I/O data signals associated with the signals 316. In another embodiment, the device 300 may also include a database 312. The database 312 may correspond to the database of workload characteristics and associated I/O phase offsets. The captured I/O data signals may be associated with I/O interface 310.

In a particular embodiment, the device 300 may include the phase adjust circuitry 308 and the I/O interface 310. In another embodiment, the device 300 may include the phase adjust circuitry 308, the I/O interface 310, and the data pattern buffer 314. In yet another embodiment, the device 300 may include the phase adjust circuitry 308, the I/O interface 310, the data pattern buffer 314, the database 312, or any combination thereof.

Figure 4:
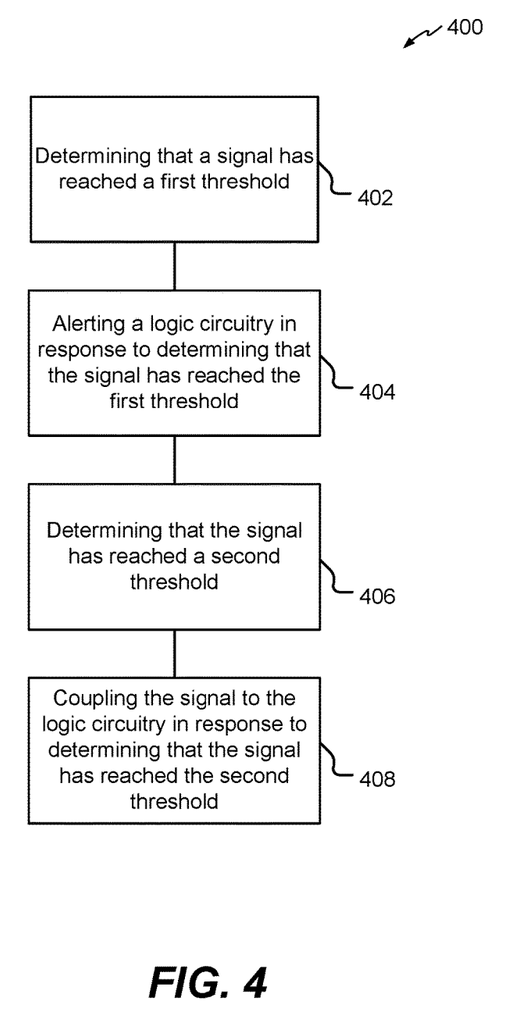
FIG. 4 is a flowchart of an illustrative, non-limiting implementation of a method of the mitigating side effects of the simultaneous switching of I/O data signal(s)

FIG. 4 depicts a flowchart of an illustrative, non-limiting implementation of a method for mitigating side effects of simultaneous switching of I/O data signals). The method 400 may be implemented by the device 300 of FIG. 3. The method 400 may include at 402 determining that a signal has reached a first threshold. For instance, the method 400 may be implemented at 402 by the glitch receiver 302 of FIG. 3. The method 400 may also include at 404 alerting a logic circuitry in response to determining that the signal has reached the first threshold. For example, the method at 404 may be implemented by the glitch receiver 302 of FIG. 3. The method 400 may also include determining at 406 that the signal has reached a second threshold. For instance, the method at 406 may be implemented by the glitch receiver 302 of FIG. 3. The method 400 may also include coupling the signal to the logic circuitry in response to determining at 408 that the signal has reached the second threshold. The method at 408 may be implemented by the glitch receiver 302 of FIG. 3, for example.

Figure 5:
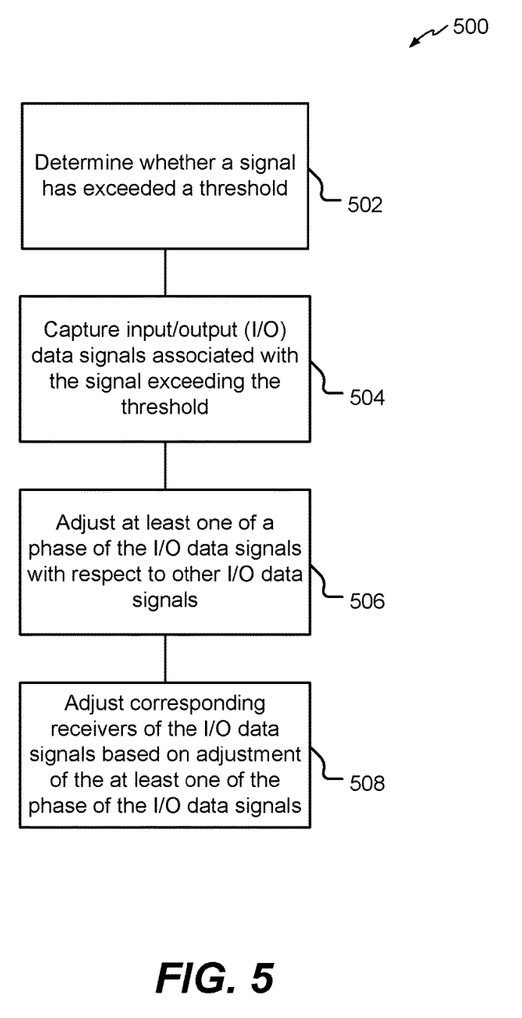
FIG. 5 is a flowchart of another illustrative, non-limiting implementation of a method of mitigating the side effects of simultaneous switching of I/O data signal(s)

Turning to FIG. 5, this figure depicts a flowchart of another illustrative, non-limiting implementation of a method for mitigating the side effects of the simultaneous switching of I/O data signals. The method 500 may be implemented by the device 300 of FIG. 3. The method 500 may include determining at 502 whether a signal has exceeded a threshold. For instance, the method at 502 may be implemented by the glitch receiver 302 or the standard receiver 304 of FIG. 3. Alternatively, the method at 502 may be implemented by a noise detector distinct from the glitch receiver 302 and the standard receiver 304 of FIG. 3. The method 500 may also include capturing at 504 the I/O data signals associated with the signal that exceed the threshold. The capture may be initiated in response to determining that the signal has exceeded the threshold. The method at 504 may be implemented by the data pattern buffer 314 of FIG. 3.

The method 500 may also include adjusting at 506 at least one of a phase of the I/O data signals with respect to other I/O data signals. For example, the method at 506 may be implemented by the phase adjust circuitry 308 of FIG. 3. The method 500 may also include adjusting at 508 corresponding receivers of the I/O data signals based on adjustment of the at least one of the phase of the I/O data signals. The method at 508 may be implemented by the phase adjust circuitry 308 of FIG. 3, for instance. The method at 508 may also be implemented by another phase adjust circuitry distinct from the phase adjust circuitry 308 of FIG. 3. The adjusting of the corresponding receivers of the I/O data signals may be associated with adjusting phase alignment settings or parameters of the corresponding receivers.

Figure 6:
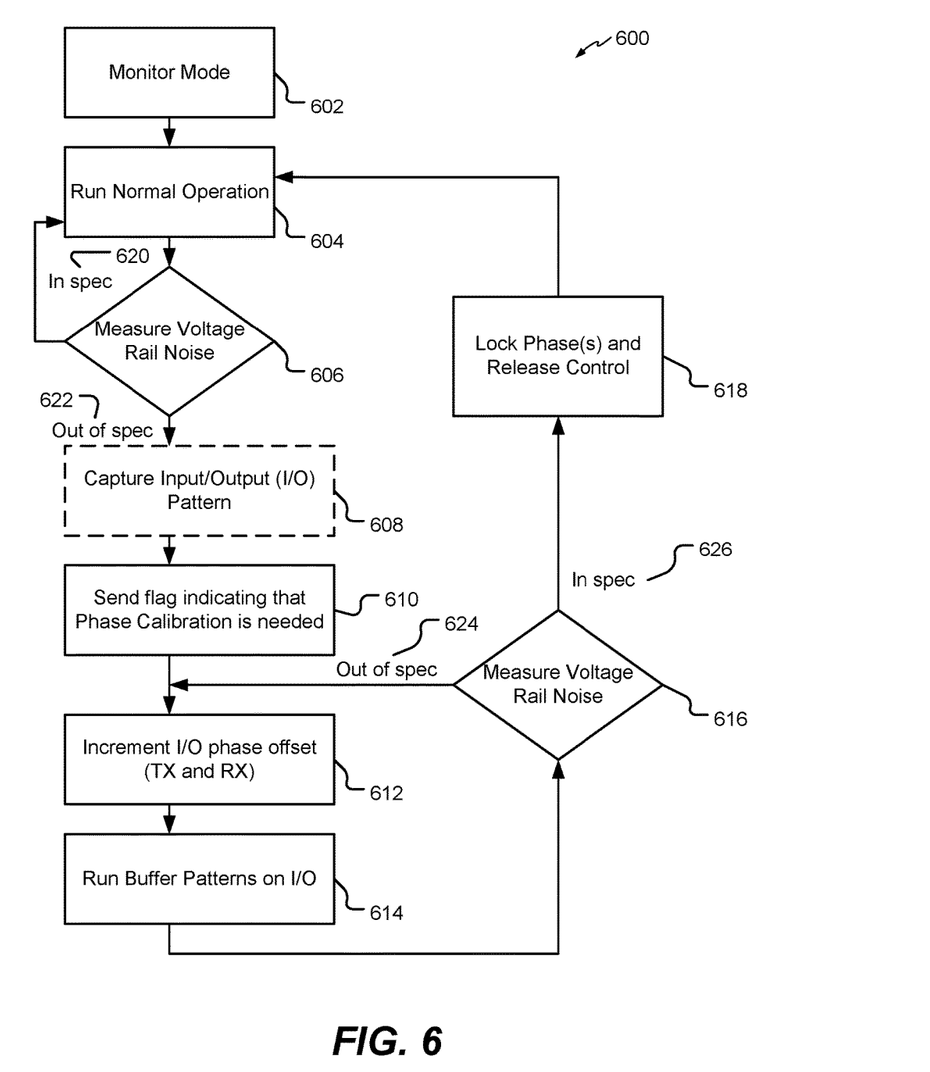
FIG. 6 is a flowchart of an illustrative, non-limiting implementation of a method for mitigating voltage rail noise.

FIG. 6 depicts a flowchart of an illustrative, non-limiting implementation of a method for mitigating voltage rail noise. The method 600 may be implemented by the device 300 of FIG. 3. The method 600 may include monitoring at 602 a system for voltage rail noise. Voltage rail noise is noise in a voltage rail due to side effects of simultaneous switching of various voltage signals or coupling of the voltage signals. At 604, the method 600 may also include running normal operation. The normal operation may correspond to running various workloads or operations. The method 600 may also include measuring at 606 the voltage rail noise. The method at 606 may be implemented by the glitch receiver 302 of FIG. 3. Alternatively, the method at 606 may be implemented by a noise detector distinct from the glitch receiver 302 of FIG. 3.

The method 600 may also include capturing an I/O pattern at 608 in response to determining at 622 that the voltage rail noise is out of specification. The method at 608 may be implemented by the data pattern buffer 314 of FIG. 3. The I/O pattern may correspond to various combinations of binary digits and sizes of ones and zeros. The I/O pattern may correspond to the input data patterns 202 of FIG. 2. The I/O pattern may be associated with the I/O interface 310 of FIG. 3. The method 600 may also include sending at 610 a flag indicating that a phase calibration is needed. The method at 610 may be implemented by the logic circuitry 306 of FIG. 3. Alternatively, the method at 610 may be implemented by a circuitry distinct from the logic circuitry 306 of FIG. 3. The flag may be sent to the phase adjust circuitry 308 of FIG. 3.

At 612, the method 600 may also include incrementing I/O phase offset. The method at 612 may be implemented in a transmit side of an I/O interface or a receive side of the I/O interface. The I/O interface may correspond to the I/O interfaces 204 of FIG. 2. The I/O interface may correspond to the I/O interface 310 of FIG. 3. The method at 612 may be implemented by the phase adjust circuitry 308 of FIG. 3.

The method 600 may also include running buffer patterns on the I/O interfaces at 614. The I/O interfaces may correspond to the I/O interface 310 of FIG. 3. The I/O interfaces may correspond to the I/O interfaces 204 of FIG. 2. The buffer patterns may be associated with the database 312 of FIG. 3. The buffer patterns may be associated with the input data patterns 202 of FIG. 2. The method at 614 may be implemented by a calibration exerciser circuitry. Alternatively, the method at 614 may be implemented by the logic circuitry 306 of FIG. 3.

The method at 616 may also include measuring the voltage rail noise for a second time to determine whether the incrementing the I/O phase offset brought the voltage rail noise within the specification. If the voltage rail noise is still out of specification at 624, the method at 612 may be repeated. The method at 618 may also include locking at least one of a phase of the I/O data signals and releasing control of an operation upon a determination at 626 that the voltage rail noise is within the specification. In an embodiment, the control is released to the system. Alternatively, the control may be released to the logic circuitry 306 of FIG. 3. In response to locking phase and releasing control, the method at 604 may be repeated.

Figure 7:
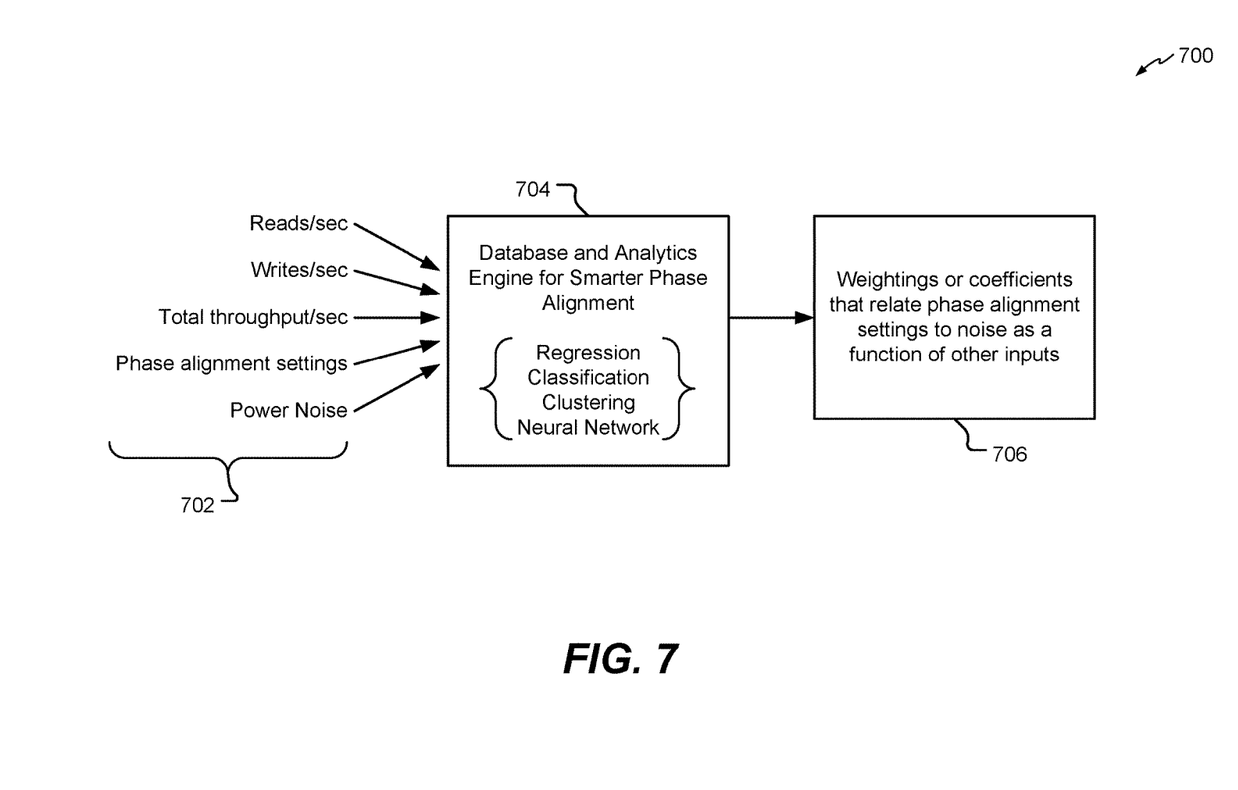
FIG. 7 is a block diagram of an exemplary embodiment of a database of workload characteristics and associated I/O phase offsets.

FIG. 7 is a block diagram of an exemplary embodiment of a database of workload characteristics and associated I/O phase offsets. The database of workload characteristics and associated I/O phase offsets may be implemented by the database 312 of FIG. 3. The Database and Analytics Engine for Smarter Phase Alignment 704 of FIG. 7 may correspond to the database 312 of FIG. 3.

The Database and Analytics Engine for Smarter Phase Alignment 704 may include the database of workload characteristics and associated I/O phase offsets. Inputs 702 may be associated with at least one of: data reads per second, data writes per second, total data throughput per second, phase alignment settings, power noise of a system, a server, and a device. The inputs 702 may correspond to various workload characteristics associated with particular operations. The inputs 702 may also correspond to various phase adjustments to I/O data signals. The I/O data signals may be associated with a particular workload or combination of workloads. Outputs 706 may include weightings or coefficients that relate phase alignment settings to signal noise as a function of other inputs. The other inputs may correspond to at least the inputs 702. The outputs 706 may be associated with the buffer patterns of the method 614 of FIG. 6.

In another embodiment, the Database and Analytics Engine for Smarter Phase Alignment 704 may also receive new workload characteristics and associated I/O phase offsets based on a call home operation that feeds new characteristics of new workload. The new characteristics may be associated with at least one of: data reads per second, data writes per second, total data throughput per second, phase alignment settings, power noise of a system, a server, or a device for a particular operation. During the call home operation, machine learning algorithms of the Database and Analytics Engine for Smarter Phase Alignment 704 may be ran at fixed intervals and may update the outputs 706 with new weightings or coefficients based on the new characteristics.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a non-transitory computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. For example, an embodiment may include multiple processors connected to a single memory controller, either using separate processor busses from each processor to the memory controller, or using a single shared system bus that is connected to all processors and the memory controller. Thus, the present disclosure is not intended to be limited to the embodiments shown herein but is to be accorded the widest scope possible consistent with the principles and features as defined by the following claims.

The invention claimed is:
1. An apparatus comprising:
logic circuitry;
a glitch receiver configured to:
  determine that a first signal has reached a first threshold; and
  in response to determining that the first signal has reached the first threshold,
    couple the first signal to the logic circuitry;
a standard receiver configured to receive the first signal, wherein the glitch receiver and the standard receiver are coupled in parallel to the logic circuitry; and phase adjust circuitry configured to adjust a phase of a first I/O data signal with respect to a second I/O data signal in response to the first signal reaching a second threshold.

2. The apparatus of claim 1, wherein the glitch receiver is further configured to determine that the first signal has not reached the first threshold for a particular period of time, and in response to the first signal not reaching the first threshold, asserting a flag to indicate that a phase calibration is required.

3. The apparatus of claim 1, wherein the at least one of the phase of first I/O data signals is adjusted based on a database of workload characteristics and associated I/O phase offsets.

4. The apparatus of claim 1, wherein the phase adjust circuitry is further configured to add at least one of test data patterns or data patterns captured over a period of time across I/O interfaces that are associated with first I/O data signals.

5. The apparatus of claim 4, wherein the phase adjust circuitry is further configured to:
determine whether the first signal is greater than the second threshold in response to adding the test data patterns or the data patterns captured over the period of time; and
adjust, for a second time, the phase of the first I/O data signals with respect to second I/O data signals in response to determining that the first signal is greater than the second threshold.

6. The apparatus of claim 5, wherein the phase adjust circuitry is further configured to maintain the phase of the first I/O data signals based on adjustment of the at least one of the phase of the first I/O data signals for the second time.

7. The apparatus of claim 1, further comprising a data pattern buffer configured to capture input/output (I/O) data signals associated with the first signal.

8. The apparatus of claim 7, further comprising a database of workload characteristics and associated I/O phase offsets, wherein the database comprises the captured I/O data signals and phase adjustments applied to the captured I/O data signals.

9. A method comprising:
determining that a first signal has reached a first threshold;
in response to determining that the first signal has reached the first threshold, alerting logic circuitry;
determining that the first signal has reached a second threshold;
in response to determining that the first signal has reached the second threshold, coupling the first signal to the logic circuitry; and
in response to determining that the first signal is greater than a third threshold,
adjusting a phase of a first I/O data signal with respect to a second I/O data signal.

10. The method of claim 9, further comprising asserting a flag to indicate that a phase calibration is required.

11. The method of claim 10, further comprising:
in response to asserting the flag, adding at least one of test data patterns and data patterns across input/output (I/O) interfaces that are associated with I/O data signals, wherein the I/O data signals are associated with the first signal reaching the third threshold, and wherein the data patterns are captured over a period of time.

12. The method of claim 9, further comprising adjusting at least one of a phase of input/output (I/O) data signals associated with the first signal reaching the third threshold.

13. The method of claim 12, further comprising adding, during a phase calibration, at least one of test data patterns or data patterns captured over a period of time across I/O interfaces that are associated with the I/O data signals.

14. The method of claim 9, further comprising sending at least one of workload characteristic data information associated with the first signal reaching the third threshold and a sensed supply voltage.

15. The method of claim 14, further comprising receiving at least one of a weight or coefficient associated with particular phase alignments, wherein a subsequent adjustment of the at least one of the phase of the I/O data signals is based on the weight or the coefficient.

16. A computer program product for phase adjustments of signals, the computer program product comprising a computer readable storage medium having program instructions embodied therewith, the program instructions executable by a device to cause the device to:
determine whether a signal has exceeded a first threshold;
in response to determining that the signal has exceeded the first threshold, capture
first input/output (I/O) data signals associated with the signal exceeding the first threshold;
adjust at least one of a phase of the first I/O data signals with respect to second I/O data signals; and
adjust corresponding receivers of the first I/O data signals based on adjustment of the at least one of the phase of the first I/O data signals.

17. The computer program product of claim 16, wherein the program instructions executable by the device further cause the device to:
add at least one of test data patterns or data patterns captured over a period of time across I/O interfaces that are associated with the first I/O data signals;
in response to adding the test data patterns or the data patterns, determine whether the signal is greater than the first threshold; and
in response to determining that the signal is greater than the first threshold, readjust the phase of the first I/O data signals with respect to the second I/O data signals.

18. The computer program product of claim 17, wherein the program instructions executable by the device further cause the device to maintain the phase of the first I/O data signals based on adjustment of the at least one of the phase of the first I/O data signals.

19. The computer program product of claim 16, wherein adjustment of the at least one of the phase of the first I/O data signals is based on data included in a database of workload characteristics, associated I/O phase offsets, and a sensed supply voltage.

* * * * *